United States Patent
Takumi et al.

[15] 3,681,599
[45] Aug. 1, 1972

[54] SECTOR-TYPE CHARGED PARTICLE ENERGY ANALYZER

[72] Inventors: Kenji Takumi, Tokyo-to; Hisashi Yamamoto, Sagamihara-shi; Hidetsugu Ikegani, Yokohama-shi, all of Japan

[73] Assignees: Kabushiki Kaisha Hitachi Seisakusho, Tokyo-to; Hidetsugu Ikegani, Yokohama-shi, Japan; part interest to each

[22] Filed: Oct. 22, 1969

[21] Appl. No.: 868,646

Related U.S. Application Data

[63] Continuation-in-part of Ser. No. 468,057, June 29, 1065, abandoned, Continuation-in-part of Ser. No. 272,490, April 11, 1963, abandoned.

[30] Foreign Application Priority Data

April 16, 1962 Japan..........................37/14487

[52] U.S. Cl............................250/41.9 ME, 335/210
[51] Int. Cl..............................................H01j 39/34
[58] Field of Search........250/41.9 ME; 335/210, 213

[56] References Cited
UNITED STATES PATENTS

| | | | |
|---|---|---|---|
| 2,719,924 | 10/1955 | Oppenheimer et al. | 250/41.9 |
| 2,932,738 | 4/1960 | Bruck | 250/41.9 |
| 2,964,627 | 12/1960 | Wild | 250/41.9 |

*Primary Examiner*—William F. Lindquist
*Attorney*—Marmorek and Bierman

[57] ABSTRACT

A sector-type charged particle energy analyzer has a pair of mutually confronting sector-type magnetic poles and an incident opening through which charged particles to be analyzed are projected to the inner part of the analyzer from its outer part formed in the gap between the magnetic poles. The outer energizing coil is wound, within a gap between the pair of magnet poles, flatly expanded in a direction perpendicular to the symmetrical plane of the magnetic poles so as to render uniform the distribution of the magnetic field in the gap between the magnet poles, and, at the same time, this outer energizing coil is divided into upper and lower parts at the position of the incident opening to render it possible to increase as much as feasible the incident angle of the charged particles projected into the inner part of the anaylzer thereby increasing the analytical performance of the charged particle analyzer.

6 Claims, 26 Drawing Figures

PATENTED AUG 1 1972

INVENTORS
KENJI TAKUMI
HISASHI YAMAMOTO
HIDETSUGU IKEGAMI
BY
H. Edward Western

PATENTED AUG 1 1972 3,681,599
PRIOR ART
FIG. 2(a)
FIG. 2(c)
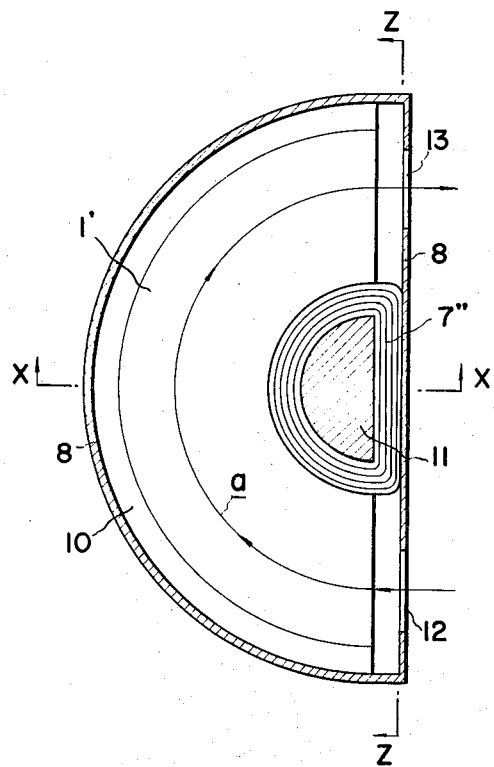
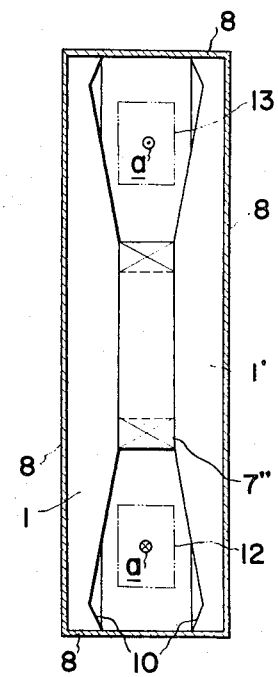
FIG. 2(b)
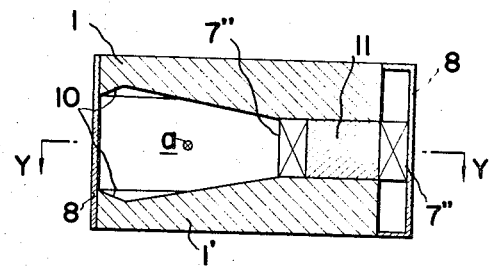
INVENTORS
KENJI TAKUMI
HISASHI YAMAMOTO
BY HIDETSUGU IKEGAMI
H. Edward Western

INVENTORS,
KENJI TAKUMI
HISASHI YAMAMOTO
BY HIDETSUGU IKEGAMI

H. Edward Mestern

SECTOR-TYPE CHARGED PARTICLE ENERGY ANALYZER

This application is a continuation-in-part of prior application Ser. No. 468,057, filed on June 29, 1965, which was a continuation-in-part of prior application Ser. No. 272,490 filed on Apr. 11, 1963, in the name of Kenji Takumi, Hisashi Yamamoto and Hidetsugu Ikegami, and entitled "Charged Particle Energy Analyser" which prior applications became abandoned.

This invention relates to an improvement in sector-type, charged particle energy analyzer, and, more particularly, it relates to a novel and unique arrangement of an energizing coil of an electromagnet for such analyzer that is capable of increasing its resolution and of obtaining large incident solid angle of charged particles.

Unlike the axial symmetry-type charged particle energy analyzers in which the electron source and detector must always be placed in a space between the magnetic poles, the sector-type charged particle energy analyzer permits the electron source and detector to be placed outside the space between the magnet poles with the result that it becomes possible to eliminate influences on the electron source and detector due to magnetic field. On account of this, charged particle energy analyzers of sector type are used not merely for analysis of charged particles but have an extremely wide range of application in various experiments such as electron-gamma coincidence method and electron-electron coincidence method in nuclear experiments, charged particle-charged particle coincidence method associated with nuclear reactions, and so on.

Conventional apparatuses, however, have low transmission efficiencies (geometrical efficiencies) and are not suitable, especially, for coincidence method. For this reason, in the present state of the art, efforts are being made to increase the transmission efficiency, whereby the resolution is being sacrificed.

It is therefore an object of the present invention to provide a charged particle energy analyzer of the sector-type with high resolution and large solid angle, wherein all the disadvantages associated with conventional apparatuses is effectively eliminated.

More specifically, it is an object of the present invention to provide unique arrangements for energizing coils of the analyzer magnet wherein the irregularity of the fringing field is prevented so that the effective range of magnetic field with regular magnetic field distribution can be expanded.

It is still another object of the invention to provide a unique coil arrangement which enables charged particles to enter from outside and/or project outward and furthermore makes it possible to minimize irregularity of the magnetic field at the end portion of the magnet poles provided at the incidence opening and/or projection opening of the charged particles.

The nature, principle, and details of the invention, as well as the manner in which the above-stated object, other objects, and advantages may best be achieved, will be more apparent by reference to the following description, when taken in conjunction with the accompanying drawing in which like parts are designated by like reference numerals and letters, and in which.

Figure 3A:
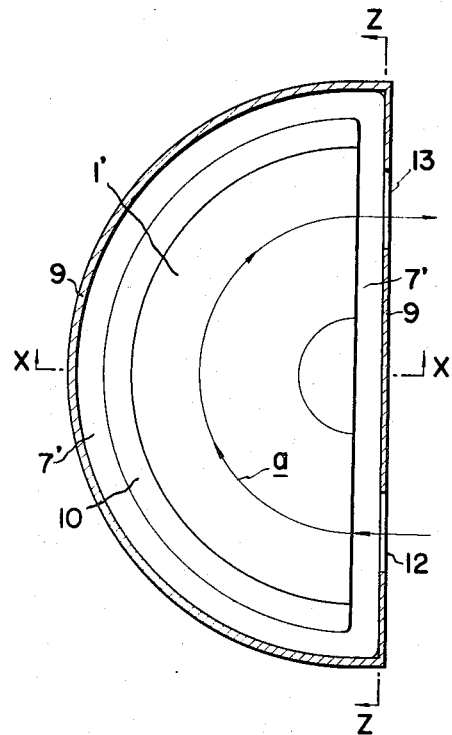
Figure 3C:
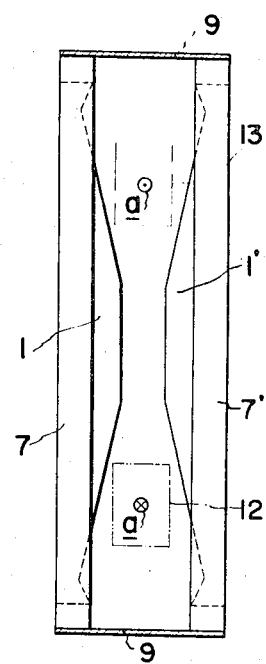
Figure 3B:
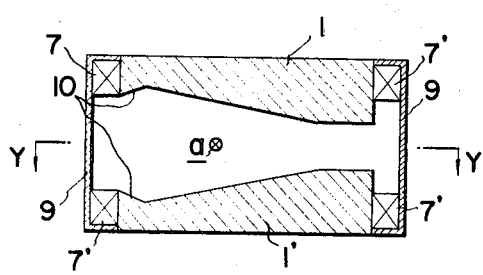
Figure 3D:
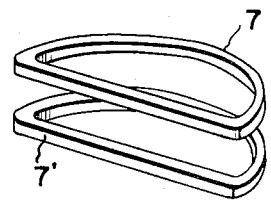
Figure 4A:
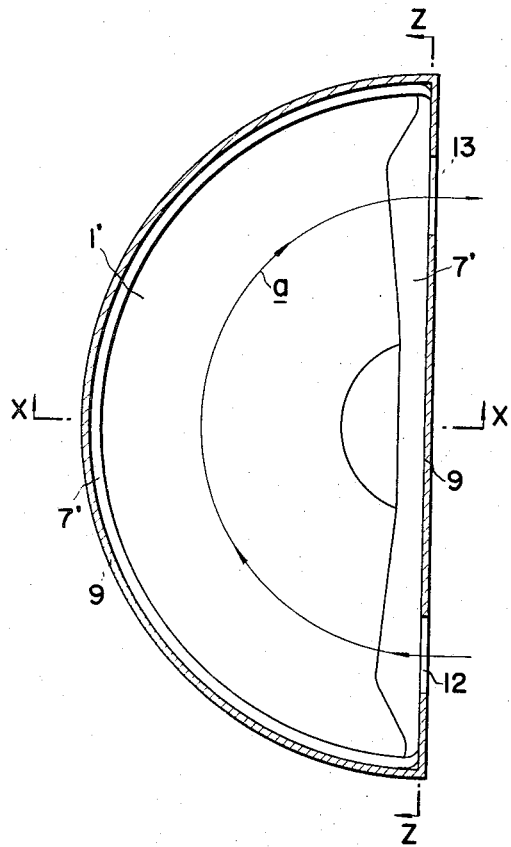
Figure 4C:
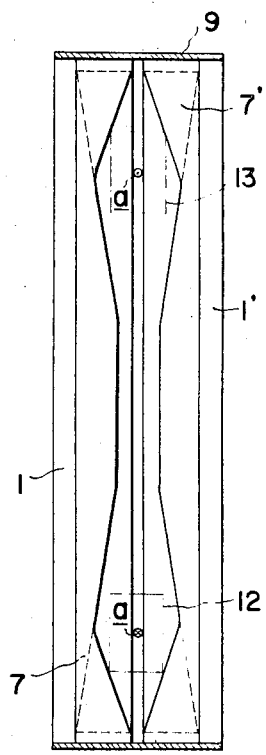
Figure 4B:
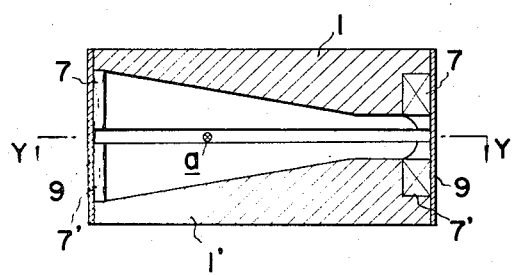
Figure 4D:
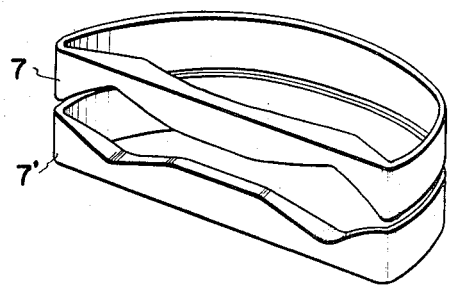
Figure 5A:
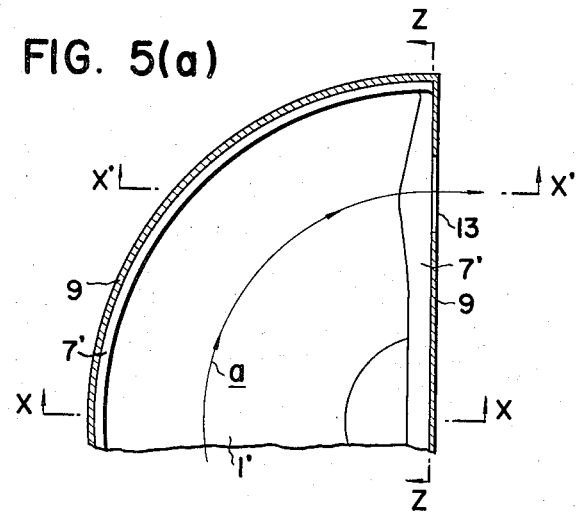
Figure 5C:
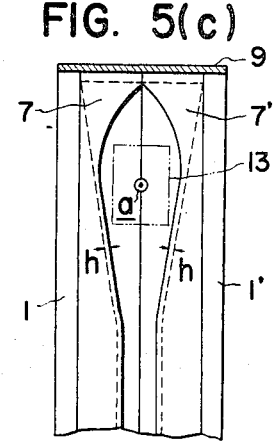
Figure 5B:
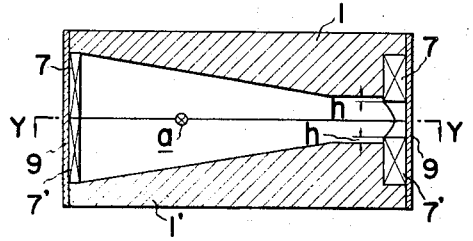
Figure 5D:
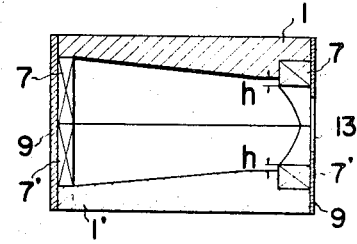
Figure 6A:
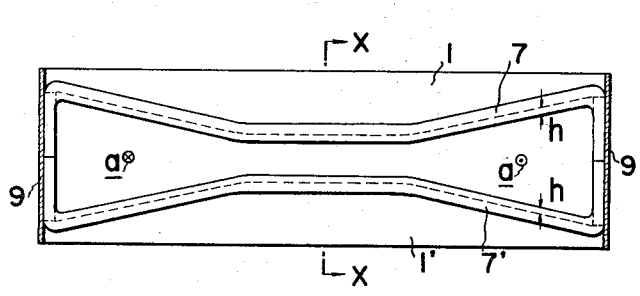
Figure 6B:
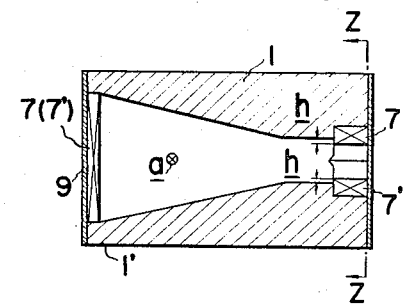
Figure 6C:
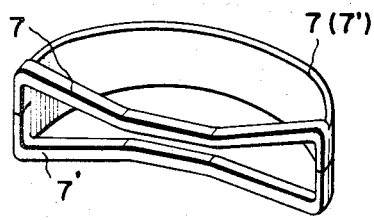

FIGS. 2a, 2b and 2c, and FIGS. 3a, 3b, and 3c show, respectively, different views of examples of the conventional core-type and armored-type electromagnets to be used for a sector-type charged particle energy analyzer, in which FIGS. 2a and 3a are sectional plan views taken respectively along the plane Y—Y of FIG. 2b and FIG. 3b including the reference radius (standard trajectory or orbit) of charged particles a, FIG. 2b and FIG. 3b are the sectional side views taken longitudinally along the plane X—X of FIG. 2a and FIG. 3a and FIGS. 2c and 3c are the sectional front views taken along the plane Z—Z of FIG. 2a and FIG. 3a;

FIG. 3d is a perspective view of only the energizing coil for the armored-type electromagnet;

FIGS. 4a, 4b and 4c show various views of one embodiment of charged particle energy analyzer according to the present invention, in which FIG. 4a is a sectional plan view taken along the plane Y—Y of FIG. 4b including the reference radius (standard orbit) a for charged particles, FIG. 4b is a sectional side view taken longitudinally along the plane X—X of FIG. 4a and FIG. 4c is a sectional front view taken along the plane Z—Z of FIG. 4a;

FIG. 4d is a perspective view showing only the energizing coil of the above embodiment;

FIGS. 5a, 5b, 5c and 5d show different views of another embodiment of charged particle energy analyzer according to the present invention, in which FIG. 5a is a sectional plan view of the essential part of the analyzer taken along the plane Y—Y of FIG. 5b, which is a symmetrical plane with respect to the magnet poles confronting each other, FIG. 5b is a sectional side view taken longitudinally along the plane X—X of FIG. 5a, FIG. 5c is a sectional front view taken along the plane Z—Z of FIG. 5a and FIG. 5d is a sectional side view taken longitudinally along the plane X'—X' of FIG. 5a;

FIG. 6a and 6b show still other embodiment of the present invention, in which FIG. 6a is a sectional front view taken along the plane Z—Z of FIG. 6b and FIG. 6b is a sectional side view taken longitudinally along the plane X—X of FIG. 6a;

FIG. 6c shows a perspective view of only the energizing coil of the above embodiment.

Figure 7A:
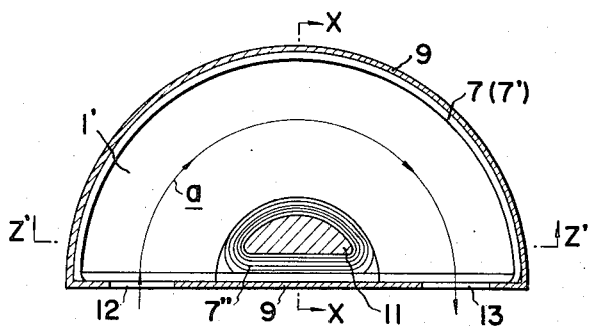
Figure 7B:
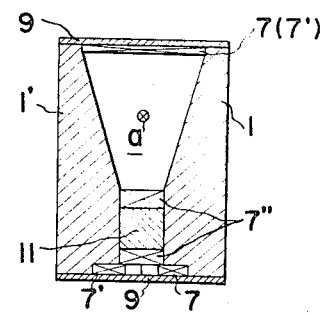
Figure 7C:
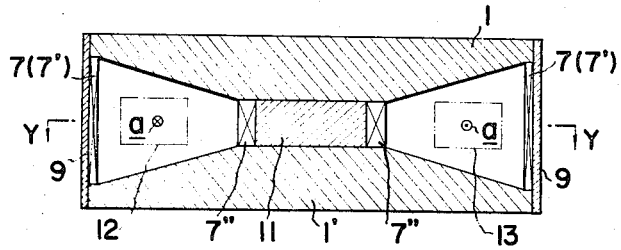
Figure 8:
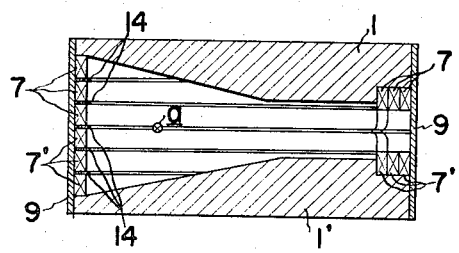
Figure 9:
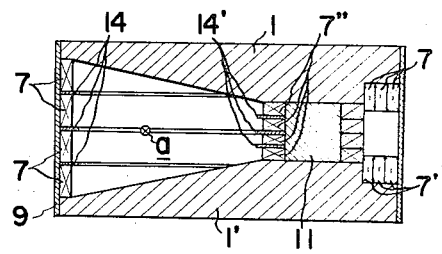
Figure 10:
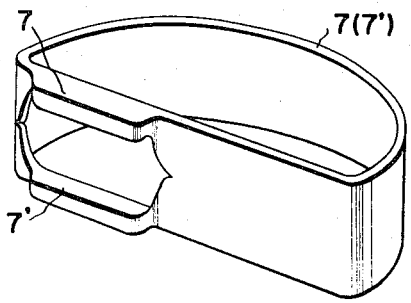

FIGS. 7a, 7b and 7c show different views of further embodiment of the present invention, in which FIG. 7a is a sectional plan view taken along the plane Y—Y of FIG. 7c which is a symmetrical plane for the pair of magnet poles, FIG. 7b is a sectional side view taken longitudinally along the plane X—X of FIG. 7a and FIG. 7c is a sectional front view taken along the plane Z'—Z' of FIG. 7a;

FIG. 8 is a sectional side view of still other embodiment of the present invention taken longitudinally along the plane corresponding to the plane X—X of the foregoing respective embodiments;

FIG. 9 is a sectional side view showing still other embodiment of the present invention taken along the plane, same as above; and FIG. 10 FIGS. a perspective view showing only an arrangement of the energizing coil in a electromagnet further embodiment of the present invention.

Figure 1A:
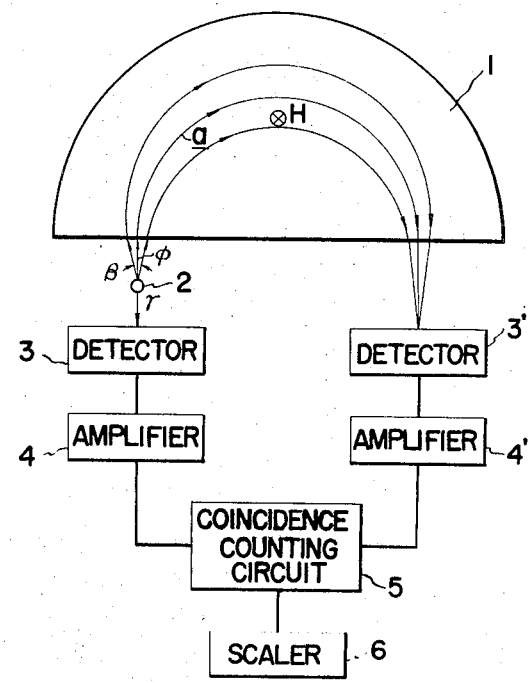
FIG. 1a is a block diagram showing schematically the basic principle of the electron-gamma coincidence method using a conventional sector-type charged particle energy analyzer.
Figure 1B:
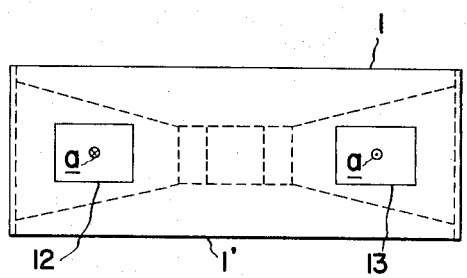
FIG. 1b is a front view of the above-mentioned analyzer as seen from the detector side.

Referring to Figs. 1a and 1b, the apparatus comprises, essentially, a sector-type electromagnetic 1 for a sector-type energy spectrometer, an electron source 2, detectors 3 and 3' for detecting gamma rays and electrons, respectively, amplifiers 4 and 4', a coincidence counting circuit 5, and a scaler 6. The arrow mark a indicates the reference radius (standard orbit) of electrons (or β -particles), and the numerals 12 and 13, respectively, designate the incidence opening and outward projection opening of charged particles (in this case, electrons).

When, for example, gamma rays γ and electrons (or β - particles) β are being emitted simultaneously from the electron source 2, the gamma rays γ are detected by the detector 3, and the electrons β are projected into the magnetic field H formed between the magnet poles 1 and 1' of the electromagnet by way of the incident opening 12, are then energy-analyzed by the said magnetic field H, and finally taken out of the outward projection opening 13 to be detected by the detector 3'. The outputs of the two detectors are amplified by the respective amplifiers 4 and 4' and enter into the coincidence counting circuit 5. When these amplified outputs are subjected to coincidence counting, they are recorded in the scaler 6.

Thus, the charged particle energy analyzers of sector type have an extremely wide range of application that cannot be attained from the axial symmetry-type charged particle energy analyzer, since the electron source and/or the detector can be placed outside the magnetic field for analyses. In the conventional analyzers of sector type, however, there takes place intolerable degree of disturbance in the distribution of the magnetic field at the end portions of the magnet poles, including the positions for the incident opening 12 and outward projection opening 13 for charged particles, and the effective range of the magnetic field where the distribution of magnetic field is uniform is considerably reduced and the effective incident solid angle φ of the charged particles (a solid angle formed by the effective magnetic field space with respect to the electron source) becomes smaller with the result that collecting efficiency (geometrical efficiency) is remarkably lowered. Furthermore, in the case of carrying out coincidence counting, the effective incident solid angle will become all the more smaller because the electron source will be placed outside the magnet poles. Heretofore, efforts have been made to increase the said collecting efficiency by utilizing even the region with intolerably irregular magnetic fields, which eventually resulted in sacrificing the resolution of the analyzer.

Further, to provide the incident and/or outward projection opening of charged particles around the outer peripheral wall of the sector-type electromagnet does, in effect, restrict possible extent of arranging the energizing coils for the electromagnet. That is, the energizing coils cannot be provided at the positions of the incident opening and outward projection opening of charged particles. On account of this, the electromagnet used for the conventional sector-type charged particle energy analyzers were mostly of a so-called "iron-core type" wherein the exciting coil is wound around an iron core arranging at an inner side of the charged particle orbit, and a so-called "armored type" wherein the energizing coil is wound at the outer side of the charged particle orbit was seldom used.

In FIGS. 2a, 2b and 2c, as well as 3a, 3b and 3c, reference numerals 1 and 1' are a pair of magnet poles disposed symmetrically with respect to the plane (Y—Y plane) containing the reference radius (standard orbit) a of charged particles and 7, 7' and 7'' are the energizing coils thereof. In the core-type electromagnet as shown in FIG. 2a, the energizing coil is wound around an iron core 11 bridging across the center parts of a pair of sector-type magnet poles 1 and 1' in the manner as shown by 7''. In the armored-type electromagnet as shown in FIG. 3a, the energizing coil is divided into two parts (upper and lower coils) and wound at positions slightly retracted from the respective upper and lower surfaces of the magnet poles 1 and 1' along the outer peripheral surfaces of said respective magnet poles. The reference numeral 8 designates vacuum walls in the case of the core-type electromagnet, and 9 designates return yokes which also serve for the vacuum walls in the case of the armored-type electromagnet. 10 designates shims provided at the end parts of the respective magnet poles. These two coil arrangements have respectively advantages and disadvantages. In the core-type arrangement shown in FIG. 2a, while it has an advantage of low electric consumption because of the coil 7'' being wound around the iron core, it has a disadvantage such that the magnetic field extends excessively outside the pole gap at the end parts of the magnet poles, thereby rendering magnetic influences to the gamma ray and the electron detectors, etc. Also, in the armored-type arrangement of FIG. 3a, since the coils 7 and 7' are wound around the outer peripheral surfaces at the end parts of the magnet poles, the electric power consumption is larger, but the magnetic field does not protrude outwardly from the pole gap beyond the return yoke 9, because of the existence of the said yoke 9. However, since the coils are disposed at the outside of the pole gap (upper and lower side of the respective pole surfaces) away from the incident opening 12 and outward projection opening 13 of charged particles, the equimagnetic-potential curves become greatly irregular at the fringing field, and the electron beam flowing along the outer side of the reference radius a cannot assume a very large solid incidence angle since the energy resolution drops because of this irregularity of the magnetic field. If, in order to increase the effective solid incidence angle as viewed from the electron source, the pole gap is increased, the irregularity of the fringing field will become even more, and high resolution cannot be obtained. For the purpose of avoiding the irregular portions of the fringing field, the reference radius a must be made smaller, but this is a great disadvantage in view of the fact that the collecting efficiency of the spectrometer at the time of constant resolution is proportional to the square of the reference radius.

The embodiment of the present invention shown in FIGS. 4a, 4b and 4c comprises a pair of sector-type magnet poles 1 and 1' which are disposed symmetrically with respect to the Y—Y plane, energizing coils 7 and 7', and a return yoke 9. This return yoke 9 bridges across the outer peripheral end surfaces of the magnet poles 1 and 1', and at positions where the portions of the said yoke 9 bridging across the linear end surfaces of the magnet poles cross over the charged particle reference radius a, there are provided the incident opening 12 and outward projection opening 13 for charged particles. The energizing coils 7 and 7' are disposed along the inner surface of this return yoke 9 and within the gap between said both magnet poles. That is, the inclination of the mutually confronting pole surfaces of the said magnet poles 1 and 1' extends continuously and uniformly up to the inner surface of the return yoke 9. Inside of the return yoke 9 constitutes readily the pole gap. At a position along the return yoke portion which bridges across the arc-shaped outer periphery of the magnet poles, the respective energizing coils 7 and 7' are wound, flatly expanded in a direction perpendicular to the Y—Y plane which is the symmetrical plane of the said both magnet poles. The energizing coils 7 and 7' have substantially equal number of ampere turns and are energized in series. In so doing, it is possible to reduce remarkably irregularity of the magnetic field at the end portions of the magnet poles as well as leakage of magnetic flux. On the other hand, the energizing coils 7 and 7' are divided into upper and lower parts, as shown in FIG. 4d, only at the positions where the incident opening and outward projection openings for charged particles are provided, so as to enable incidence and outward projection of charged particles. In this arrangement, although the coils are wound expandedly over the outer periphery of the pole gap, incidence and outward projection of charged particles will not be hindered. Furthermore, it is possible to reduce irregularity of the magnetic field at the fringing field to a considerable extent and to extend effective range of the magnetic field up to just inside of the outer energizing coils 7 and 7'.

Referring to FIGS. 5a, 5b, 5c and 5d, the energizing coils 7 and 7' are wound within the pole gap and along the inner surface of the return yoke 9 in a flatly expanded shape, in a direction perpendicular to the Y—Y plane until the said energizing coils 7 and 7' come in contact with each other. The coils are further divided into upper and lower parts at the positions of the incident opening and the outward projection opening of charged particles. The coils thus divided are wound along the inclination of the pole surfaces at the respective sides and slightly protruded inwardly from the pole surfaces, as shown with the reference character h in the drawing. By such arrangement, it is possible to further reduce irregularity in the magnetic field at the positions where the incident opening 12 and the outward projection opening 13 of charged particles are provided.

In FIGS. 6a, 6b and 6c, the energizing coils 7 and 7' are wound together as a single coil at a position along the inner surface of the portion of the return yoke bridging across the arc-shaped magnet pole and surfaces, and at the portion of the return yoke where the incident opening and outward projection opening for charged particles are provided, the said integrated coil is divided into upper coil 7 and lower coil 7' having equal number of turns each other. Then, each coil is wound along the inclination of the respective magnet pole surfaces and made to protrude slightly inward from the magnet pole surfaces as shown by reference character h in the above drawing. Furthermore, at the boarder between the portion where the return yoke bridges across the arc-shaped magnet pole ends and the portion where the said return yoke bridges across the linear magnet pole ends, the integrated coil is abruptly divided into upper and lower parts so that there can be reserved sufficiently large space for the divided coils to be disposed along the inclination of the respective magnet pole surfaces in such a manner that they are protruded slightly inwardly from the said respective pole surfaces, whereby it becomes possible to further enlarge the incident solid angle of charged particles.

Referring to FIGS. 7a, 7b and 7c, the analyzer comprises outer coils 7 and 7' disposed in various manners as mentioned above and inner coil 7'' wound around the iron core 11 bridging across the center portions of the magnet poles. These outer coils 7 and 7' are connected in series, and the equal number of energizing ampere turns is given to the inner coil 7'' and the said serially connected outer coils 7 and 7'. Thus, leakage of magnetic flux can be reduced all the more and distribution of the magnetic field becomes more uniform.

In the embodiment shown in FIG. 8, the outer energizing coils 7 and 7' wound along the inner surface of the return yoke and within the pole gap are divided respectively into a plurality of small coils, each coil being connected in series. Between each of the said small coils, there is provided a shim plate 14 which is connected with the return yoke. Needless to say, at the position where the incident opening and outward projection opening for charged particles are provided, these small coils are wound after they are divided into upper and lower parts. By disposing the shim plates between each of the small coils in the above-described manner, the equimagnetic-potential curves can be arranged more regularly, and high resolution can also be obtain.

In the embodiment shown in FIG. 9, there is provided, in addition to the outer energizing coils 7 and 7', an inner energizing coil 7'', and both the outer energizing coils 7 and 7' connected in series and the inner energizing coil 7'' are, respectively, divided into an equal number of small coils. Between each of these small coils of the outer energizing coils, a shim plate 14 which is connected to the return yoke 9 is provided. And between each of the small coils of the inner energizing coil, there is provided a shim plate 14' which is connected to an iron-core 11. In such an arrangement, the equimagnetic-potential curves becomes almost ideal and there will be the least irregularity of magnetic field at the end part of the magnet poles or leakage of magnetic flux.

Furthermore, in the coil arrangement shown in FIG. 10, the energizing coils 7 and 7' are divided into upper and lower parts only at the position of the incident opening for charged particles, and, on the other portion, the said coils 7 and 7' are integrally wound in a flat and expanded in a direction perpendicular to the symmetrical plane of the magnet poles. This way of coil arrangement is used in the case when the detector is placed in the pole gap and only the electron source is placed outside. It goes without saying that in various coil arrangements shown with respect to several specific embodiments, division of the energizing coils may be dispensed with at the position of the outward projection opening for charged particles, and, instead, the coils can be divided into upper and lower parts only at the position of the incident opening for charged particles.

As has been described in detail, the present invention has succeeded in preventing irregularity of the magnetic field at the fringing or end portion of the magnet poles by winding the outer energizing coils along the inner peripheral surface of the return yoke which bridge across the outer peripheral end surfaces of the magnet poles and within the pole gap, and, further, has succeeded in making sufficiently large the available space between the magnet poles by dividing the said outer energizing coils into upper and lower parts and then winding the same in a flat and expanded shape.

Also, by dividing the above-mentioned outer energizing coils into upper and lower parts at the position of both the incident opening and outward projection opening for charged particles or only at the position of the incident opening, it was made possible to cause the incidence, or both incidence and outward projection of charged particles. Furthermore, by winding the respective outer energizing coils divided into upper and lower parts along the inclination of magnet pole surface at the respective sides and in a manner that the divided coils protrude slightly inwardly from the respective pole surfaces, it was made possible to reduce remarkably irregularity in the magnetic field as well as leakage of magnetic flux at the end portions of the magnet poles where the incident opening or both said incident opening and outward projection opening for charged particles are provided. Also, by providing together the outer energizing coils connected in series and having particular arrangements and the inner energizing coil and by giving them equal number of ampere turn, the magnetic flux density in the magnet poles, the return yoke and the iron-core could be made sufficiently small, which help save the quantity of iron material to be used, and, at the same time distribution of the magnetic field could be made all the more uniform. Moreover, by dividing the outer energizing coil and inner energizing coil, respectively, into a plurality of small coils, each being connected in series, and by providing shim plates between each of said small coils, the equimagnetic-potential curves could be made more uniform.

By the coil arrangements of the present invention as described above, the space in the pole gap where no irregularity of magnetic field exists, i.e., the effective space for magnetic field, can be extended very close to the inside of the outer energizing coils, the effective incidence solid angle of charged particles increases and the charged particles which travel outside the reference radius are not disturbed by any irregular magnetic field; on account of this, resolution of the analyzer is considerably high. Also, since the pole gap as well as the effective incidence solid angle can be made extremely large, collecting efficiency of charged particles can be made remarkably high.

It is to be observed that, since the charged particle energy analyzer of the present invention possesses high resolution and large collecting efficiency, the apparatus is particularly applicable to energy-analysis of weak radiation source, energy analysis of radiation sources of considerably short life, and experiments such as electron-gamma ray coincidence counting, etc. Besides, the apparatus has an extremely wide range of application such as charged particle energy analysis in nuclear reactions.

Although this invention has been described with respect to particular embodiments thereof, it is not to be so limited as changes and modifications can be made therein which are within the full intended scope of the invention, as defined by the appended claims. Of course, viewing from broader aspects, it will be possible for those skilled in the art that the electromagnet for analysis of the sector-type charged particle energy analyzer of the present invention can be employed as a mass spectrography and the like, or as a precise gamma-ray energy analyzer in which, Compton electrons or photoelectrons which can be obtained by addition of a suitable converter to the radiation source is used.

What is claimed is:

1. A sector-type charged particle energy analyzer comprising
    a pair of mutually confronting sector-shaped magnetic poles disposed symmetrically with respect to a plane containing an arcuate standard orbit of charged particles, each of said poles having an outer peripheral end surface consisting essentially of an arcuate portion and a flat portion;
    a return yoke bridging across the outer peripheral end surfaces of said pair of magnetic poles;
    an outer energizing coil wound within a gap provided between said pair of magnetic poles and along the inner peripheral surface of said return yoke;
    an incident opening provided in said return yoke at a portion where said standard orbit crosses said return yoke;
    said outer energizing coil being flatly expanded in a direction perpendicular to the symmetrical plane of said pair of magnetic poles, but being divided into upper and lower parts only at the portion where said incident opening is provided;
    a source of charged particles to be analyzed provided outside of said incident opening;
    a detector means for detecting the charged particles passing through said gap between said pair of magnetic poles.

2. A sector-type charged particle energy analyzer, as claimed in claim 1, wherein the upper and lower parts of said outer energizing coil are wound along the inclination of the respective pole surfaces of said pair of magnetic poles and protruding slightly inwardly from said respective pole surfaces.

3. A sector-type charged particle energy analyzer comprising
    a pair of mutually confronting sector-shaped magnetic poles disposed symmetrically with respect to a plane containing an arcuate standard orbit of charged particles, each of said poles having an outer peripheral end surface consisting essentially of an arcuate portion and a flat portion;
    a return yoke bridging across the outer peripheral end surfaces of said pair of magnetic poles;
    an iron core bridging across the center portions of said pair of magnetic poles;
    an outer energizing coil wound within a gap provided between said pair of magnetic poles and along the inner peripheral surface of said return yoke;
    an inner energizing coil wound around said iron core;
    an incident opening provided in said return yoke at a portion where said standard orbit crosses said return yoke;
    said outer energizing coil being flatly expanded in a direction perpendicular to the symmetrical plane of said pair of magnetic poles, but being divided into upper and lower parts only at the portion where said incident opening is provided;

a source of charged particles to be analyzed provided outside of said incident opening;

and detector means for charged particles passing through said gap between said pair of magnetic poles.

4. A sector-type charged particle energy analyzer, as claimed in claim 3, wherein the upper and lower parts of said outer energizing coil are wound along the inclination of the respective pole surfaces of said pair of magnetic poles and protruding slightly inwardly from said respective pole surfaces.

5. A sector-type charged particle energy analyzer, as claimed in claim 4, wherein both outer and inner energizing coils are respectively divided into a plurality of small coils which are mutually connected in series and disposed in a row in a direction perpendicular to the symmetrical plane of said pair of magnetic poles, and shim plates are provided between each pair of adjacent coils.

6. A sector-type charged particle energy analyzer, as claimed in claim 3, wherein both outer and inner energizing coils are respectively divided into a plurality of small coils which are mutually connected in series and disposed in a row in a direction perpendicular to the symmetrical plane of said pair of magnetic poles, and shim plates are provided between each pair of adjacent small coils.

* * * * *